United States Patent [19]

Ito et al.

[11] 3,736,815

[45] June 5, 1973

[54] POWER TRANSMISSION MECHANISM

[75] Inventors: Shin Ito; Seitoku Kubo, both of Toyota, Japan

[73] Assignee: Toyota Jidosha Kogyo Kabushiki Kaisha, Toyota-shi, Japan

[22] Filed: Jan. 20, 1972

[21] Appl. No.: 219,266

[30] Foreign Application Priority Data

Feb. 15, 1971 Japan..................................46/6183

[52] U.S. Cl.................................................74/759
[51] Int. Cl............................F16h 3/44, F16h 57/10
[58] Field of Search................................74/753, 759

[56] References Cited

UNITED STATES PATENTS 3,678,784  7/1972  Lemieux................................74/759
3,678,785  7/1972  Stahlberg..............................74/759

*Primary Examiner*—Allan D. Herrmann
*Attorney*—Toren & McGeady

[57] ABSTRACT

A four-forward-speed transmission comprising an intermediate shaft, two sets of single pinion planetary gears, and a double pinion planetary gear, with all of said components being concentrically arranged between an input shaft and an output shaft. A first clutch is adapted to apply an input to the intermediate shaft, and a second clutch is adapted to apply an input to both sun gears of the two sets of single pinion planetary gears which are integrally connected. A first brake is adapted to restrict the rotation of both the sun gears of the two sets of single pinion planetary gears, and a second brake is adapted to simultaneously restrict the rotation of a carrier of the second single pinion planetary gear of said two sets of single pinion planetary gears as well as the rotation of a carrier of the double pinion planetary gear. A third brake is adapted to restrict the rotation of a ring gear of the double pinion planetary gear. The first clutch is always in operation when a vehicle is moving forward, and therefore first speed is obtained by operation of the third brake. Second speed is obtained by operation of the first brake, the fourth speed by the operation of the second clutch, and reverse speed by operation of the second clutch and the third brake.

6 Claims, 1 Drawing Figure

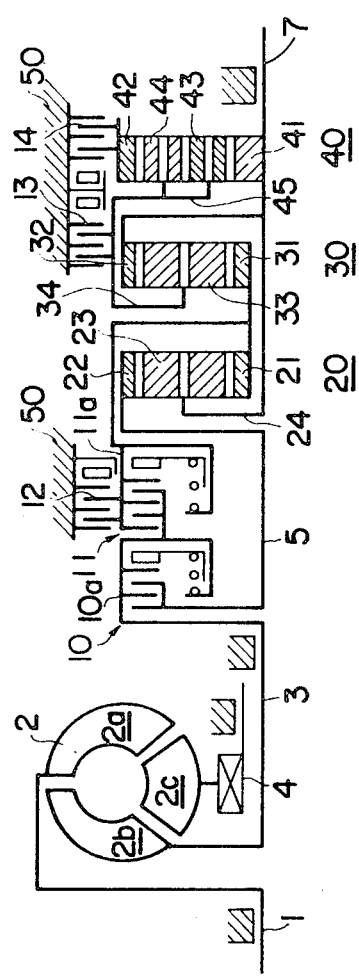

POWER TRANSMISSION MECHANISM

BACKGROUND OF THE INVENTION

The present invention relates to a transmission for automobiles, and more particularly to a four-forward-speed transmission.

An object of this invention is to provide a four-forward-speed transmission which is advantageous in construction.

Another object of this invention is to provide an appropriate range of gear ratios.

The various features of novelty which characterize the invention are pointed out with particularlity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

The single FIGURE of the drawing is a schematic diagram partially in section showing the transmission of the present invention.

DESCRIPTION OF A PREFERRED EMBODIMENT

Referring to the drawing, a driving shaft 1 on the engine side is connected to a pump impeller 2a of a fluid torque converter 2. A turbine runner 2b of said torque converter 2 is connected to an input shaft 3 of a gear train. A stator 2c of said torque converter is supported by a one-way clutch 4. Thus, the input torque from the driving shaft 1 is applied to the input shaft 3 thereby to transmit the desired rotational load.

The gear train comprises the input shaft 3, an intermediate shaft 5, two sets of single pinion planetary gears 20 and 30, a set of double pinion planetary gears 40 and an output shaft 7, which are all arranged concentrically. Further more, the gear train comprises two sets of clutches 10 and 11 and three sets of brakes 12 through 14. The two sets of single pinion planetary gears 20 and 30 are of the same construction, and comprise sun gears 21 and 31, ring gears 22 and 32, planetary pinions 23 and 33 which are meshed with the ring gears 22 and 32, and carriers 24 and 34 which are adapted to rotatably support the planetary pinions 23 and 33.

The operation of both single pinion planetary gears 20 and 30 will be described with reference to the first single pinion planetary gear 20. The ring gear 22 is rotated by means of the sun gear 21 through the planetary pinion 23 with the directions of rotation of the gears 21 and 22 being reversed. When the rotation of one of the gears 21 or 22 is restricted, the carrier 24 is rotated in the same direction as the unrestricted gear 21 or 22.

The double pinion planetary gear 40 comprises a sun gear 41, a ring gear 42, a first planetary pinion 43 which is meshed with the sun gear 41, a second planetary pinion 44 which is meshed with the first planetary pinion 43 and the ring gear 42, and a carrier 45 adapted to rotatably support both planetary pinions 43 and 44. Thus, it will be apparent that the operation of the double pinion planetary gear 40 will be reversed with respect to that of the first single pinion planetary gear 20.

The first clutch 10 is provided between the input shaft 3 and the intermediate shaft 5. The second clutch 11 is located between the clutch drum 10a of the first clutch and the integrally joined sun gears 21 and 31 of the single pinion planetary gears 20 and 30. The intermediate shaft 5 is connected to the ring gear 22 of the first single pinion planetary gear 20. The first brake 12 consisting of multiple discs is provided between a clutch drum 11a of the second clutch 11 and a case 50. The carrier 24 of the first single pinion planetary gear 20, the ring gear 32 of the second single pinion planetary gear 30 and the sun gear 41 of the double pinion planetary gear 40 are integrally connected to the output shaft 7. The carrier 34 of the second single pinion planetary gear 30 is provided with the second brake 13 consisting of multiple discs located between it and the case 50, and is connected to the carrier 45 of the double pinion planetary gear 40. The ring gear 42 of the double pinion planetary gear 40 is provided with the third brake consisting of multiple discs located between it and the case 50.

The shifting operation of the gear train of the above-described construction is summarized in the following Table I with reference to the operations of the two sets of clutches 10, 11 and of the three sets of brakes 12 through 14.

In Table I, the figures correspond to the reference numerals given to the clutches and brakes in the accompanying drawing. The mark O indicates that the clutch or brake in question is being operated by means of an associated hydraulic operating mechanism. In the column for gear ratio calculating formulas, $p_1$ represents the gear ratio between the sun gear 21 and the ring gear 22 of the first single pinion planetary gear 20; $p_2$ the gear ratio between the sun gear 31 and the ring gear 32 of the second single pinion planetary gear 30; and $p_3$ the gear ratio between the sun gear 41 and the ring gear 42 of the double pinion planetary gear 40. The values shown in the column for examples of gear ratios are calculated by assuming that all gear ratios $p_1$, $p_2$ and $p_3$ are 0.40.

TABLE I

| Shift range | 10 | 11 | 12 | 13 | 14 | Gear ratio calculating formula | Example of gear ratio |
|---|---|---|---|---|---|---|---|
| 1st gear | O | | | | O | $1+p_1(1+p_2)/p_2(1-p_3)$ | 3.33 |
| 2nd gear | O | | | O | | $1+p_1/p_2+p_1$ | 2.40 |
| 3rd gear | O | | O | | | $1+p_1$ | 1.40 |
| 4th gear | O | O | | | | 1 | 1 |
| Reverse | | O | | | O | $1-(1+p_2)/p_2(1-p_3)$ | -4.83 |

As is apparent from the above Table, the first clutch is always in operation when the vehicle is moving forward in the first through fourth gears. Shifting is accomplished by the selective operation of appropriate mechanisms, and the shifting operation will now be described in further detail hereinbelow.

In first gear, the input rotation from the input shaft 3 is applied by the first clutch 10 through the intermediate shaft 5 to the ring gear 22 of the first single pinion planetary gear 20. It should be noted that gear 21 of the first single pinion planetary gear 20 is integrally connected with the sun gear 31 of the second single pinion planetary gear 30, and that the carrier 24 of the planetary gear 20 is integrally connected with the ring gear 32 of the planetary gear 30. Thus, the rotational speed reduced by the first single pinion planetary gear 20 is applied to the ring gear 32 of the second single pinion planetary gear 30. Consequently, a reversed rotation which is further reduced is obtained at the carrier 34 of the second single pinion planetary gear 30. This reversed rotation is applied to the carrier 45 of the double pinion planetary gear 40 in which the rotation of the ring gear 42 is restricted by the third brake 14. Thus, this rotation is transmitted through the second planetary pinion 44 and the first planetary pinion 43 located along the ring gear 42 to the sun gear 41, while being further reduced and corrected in its rotational direction. In first gear all planetary gears 20, 30 and 40 function as speed-reducing units and their rotation is derived at the output shaft 7, thus providing a first gear arrangement with a large gear ratio.

In second speed, the first clutch 10 is operated in the same manner as described above, and the input is applied to the ring gear 22 of the first single pinion planetary gear 20. At this time, the rotation of the carrier 34 of the second single pinion planetary gear is restricted by the second brake 13. Consequently, in the first single pinion planetary gear 20, the rotation from the ring gear 22 is transmitted through the planetary pinion 23 to the sun gear 21. In the second single pinion planetary gear 30, this rotation is transmitted through the sun gear 31 and the planetary pinion 33 to the ring gear 32. The rotation of the carrier 24 of the first single pinion planetary gear 20 and of the ring gear 32 of the second single pinion planetary gear 30 are derived at the output shaft 7. Thus, in second gear, both single pinion planetary gears 20 and 30 function as speed-reducing units, resulting in a second gear arrangement with a gear ratio smaller than first gear.

In third gear, the first clutch 10 is operated in the same manner as described above, and the input is applied to the ring gear 22 of the first single pinion planetary gear 20. At this time, the rotation of the sun gear 21 of the first single pinion planetary gear 20 is restricted by the first brake 12. Consequently, the rotation of the ring gear 22 is transmitted through the planetary pinion 23 located along the sun gear 21 to the carrier 24 and is derived at the output shaft 7. Thus, in this gear, only the first single pinion planetary gear 20 functions as a speed-reducing unit, thereby achieving a third gear arrangement with a gear ratio smaller than in second gear.

In fourth gear, the first clutch 10 is operated in the same manner as described above. At the same time, the input is transmitted to the ring gear 22 and the sun gear 21 of the first single pinion planetary gear 20 by means of the second clutch 11. Consequently, the planetary gear 20 is operated as a single unit without planetary motion. The second single pinion planetary gear 30 and the double pinion planetary gear 40 operate as a single unit, respectively, and the input rotation is obtained at the output shaft 7 without speed reduction. Thus, in fourth gear, none of the planetary gears perform a speed-reducing action, thereby resulting in a fourth gear arrangement with direct coupling of the input shaft 3.

In reverse gear, the second clutch 11 is engaged and the input is transmitted to the sun gear 31 of the second single pinion planetary gear 30. While the ring gear is being rotated in the reverse direction by means of the planetary pinion 33, the carrier 34 is rotated in the same direction as the sun gear 31. The rotation of the carrier 34 is transmitted to the carrier 45 of the double pinion planetary gear 40. At this time, as the rotation of the ring gear 42 is being restricted by the third brake 14, the sun gear 41 is rotated in the reverse direction through the planetary pinions 43 and 44, and the rotation thereof is derived at the output shaft 7. Thus, in reverse gear, the second single pinion planetary gear 30 and the double pinion planetary gear 40 function as speed-reducing units, thereby achieving reverse gear.

From the description presented above, it will be seen that the gear train according to this invention will provide gear ratios for four forward speeds and one reverse speed by the selective combination of two sets of single pinion planetary gears 20, 30, a set of double pinion planetary gear 40, two sets of clutches 10, 11 and three sets of brakes 12 through 14.

Further advantages of this invention derive from the fact that in the forward gears, an input is given to a ring gear having a larger diameter, thus greatly reducing a load to be applied to the gear teeth. Moreover, as shown in the examples of gear ratios in Table I, the selection of appropriate gear ratios for four speeds is made possible.

While a specific embodiment of the invention has been shown and described in detail to illustrate the application of the principles of the invention, it will be understood that the invention may be embodied otherwise without departing from such principles.

What is claimed is:

1. A power transmission mechanism comprising a casing, an input shaft, an intermediate shaft, first and second single pinion planetary gears each including a sun gear and a ring gear, a double pinion planetary gear including a sun gear and a ring gear, and an output shaft, with all of said components being concentrically arranged, a first clutch provided between said input shaft and said intermediate shaft, means integrally connecting said sun gears of said single pinion planetary gears, a second clutch provided between said input shaft and said integrally connected sun gears of said single pinion planetary gears, means connecting said intermediate shaft to said ring gear of said first single pinion planetary gear, a first brake provided between said integrally connected sun gears and said casing, a carrier for said first single pinion planetary gear, means connecting said first single pinion planetary gear, said ring gear of said second single pinion planetary gear and said sun gear of said double pinion planetary gear to said output shaft, a carrier for said second single pinion planetary gear, a second brake provided between said second single pinion planetary gear carrier and said casing, a carrier for said double pinion planetary gear connected to said second single pinion planetary gear c8 carrier, a third brake provided between said ring gear of said double pinion planetary gear and said casing, and means for effecting selective engagement and disengagement of said brakes and clutches to provide desired gear ratios for four forward speeds and one reverse speed in the operation of said transmission mechanism.

2. A transmission mechanism according to claim 1, wherein a first forward speed gear ratio is obtain by simultaneous engagement of said first clutch and of said third brake.

3. A transmission mechanism according to claim 1, wherein a second forward speed gear ratio is obtained by simultaneous engagement of said first clutch and of said second brake.

4. A transmission mechanism according to claim 1, wherein a third forward speed gear ratio is obtained by simultaneous engagement of said first clutch and of said first brake.

5. A transmission mechanism according to claim 1, wherein a fourth forward speed gear ratio is obtained by simultaneous engagement of said first and of said second clutches.

6. A transmission mechanism according to claim 1, wherein a reverse speed gear ratio is obtained by simultaneous engagement of said second clutch and of said third brake.

* * * * *